United States Patent
Hsieh

(10) Patent No.: US 8,845,925 B2
(45) Date of Patent: Sep. 30, 2014

(54) LIQUID CRYSTAL COMPOSITION AND LIQUID CRYSTAL PANEL

(71) Applicant: Chung-Ching Hsieh, Guangdong (CN)

(72) Inventor: Chung-Ching Hsieh, Guangdong (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 42 days.

(21) Appl. No.: 13/702,048

(22) PCT Filed: Nov. 14, 2012

(86) PCT No.: PCT/CN2012/084558
§ 371 (c)(1),
(2), (4) Date: Dec. 4, 2012

(87) PCT Pub. No.: WO2014/067176
PCT Pub. Date: May 8, 2014

(65) Prior Publication Data
US 2014/0118672 A1    May 1, 2014

(30) Foreign Application Priority Data

Oct. 29, 2012 (CN) .......................... 2012 1 0420839

(51) Int. Cl.
  C09K 19/52   (2006.01)
  C09K 19/30   (2006.01)
  C09K 19/54   (2006.01)
  G02F 1/1337  (2006.01)
  C09K 19/12   (2006.01)
  C09K 19/04   (2006.01)

(52) U.S. Cl.
  CPC ........ G02F 1/1337 (2013.01); *C09K 2019/122* (2013.01); *C09K 2019/3004* (2013.01); *C09K 2019/0448* (2013.01)
  USPC .............. 252/299.01; 252/299.5; 252/299.63; 349/86; 349/123; 349/130

(58) Field of Classification Search
  USPC .............. 252/299.01, 299.5, 299, 63; 349/86, 349/123, 130
  See application file for complete search history.

(56) References Cited

U.S. PATENT DOCUMENTS

| | | | | |
|---|---|---|---|---|
| 5,384,067 A | * | 1/1995 | Doane et al. | 349/183 |
| 6,104,448 A | * | 8/2000 | Doane et al. | 349/12 |
| 6,172,720 B1 | * | 1/2001 | Khan et al. | 349/35 |
| 8,654,281 B2 | * | 2/2014 | Bos et al. | 349/88 |

* cited by examiner

*Primary Examiner* — Shean C Wu
(74) *Attorney, Agent, or Firm* — Kirton McConkie; Evan R. Witt

(57) ABSTRACT

The present invention provides a polymerizable monomer, a liquid crystal composition containing the polymerizable monomer and a vertical alignment liquid crystal panel. The polymerizable monomer which the present invention provides may generate free radicals more easily under the UV exposure, so as to solve the RM residue due to the improvement of the curing ability of the RM and thus improve the image sticking issue of the liquid crystal panel.

10 Claims, 3 Drawing Sheets

LIQUID CRYSTAL COMPOSITION AND LIQUID CRYSTAL PANEL

FIELD OF THE INVENTION

The present invention relates to a liquid crystal composition, especially relates to a liquid crystal composition added with trifluoromethyl polymerizable monomers and a vertical alignment-liquid crystal panel.

BACKGROUND OF THE INVENTION

Liquid crystal display (LCD) is a flat panel display device using the characteristics of the liquid crystal materials to display images which has many advantages, such as lightweight, low driving voltage and low power consumption, and has becoming the mainstream products in the whole consumer market.

The main technical parameters to evaluate the performance of the LCD contain: ①contrast, ②brightness, ③response time and ④viewing angles. Recently, liquid crystal panels having fast response liquid crystal compositions are used to enhance the response time of the LCD.

Furthermore, referring now to FIG. 1, a schematic view of the alignment process of traditional liquid crystal panel made of fast response liquid crystal composition is shown in FIG. 1. The fast response liquid crystal compositions 30' contain one or more type of conventional liquid crystal molecules 31' and reactive monomers (RM) 32'. The liquid crystal compositions 30' are diffused on the surface of the alignment film 20' of the substrate 10' by one-drop filling technology (ODF), and the alignment process is completed after several processes including applying voltage, first UV exposure, and second UV exposure processes, etc. The FIG. 1 reveals that after completing the alignment process, quite a few of RM 32' are still remained in the liquid crystal composition 30', and thus cause the liquid crystal panel to suffer image sticking (IS) issue. Researches show that the residue of RM is related to the structure of the RM 32'.

As a result, it is necessary to provide a new monomer to solve the problems existing in the conventional technologies.

SUMMARY OF THE INVENTION

The first object of the present invention is to provide a liquid crystal composition added with a polymerizable monomer. The polymerizable monomer may generate free radicals more easily under the UV exposure, so as to solve the RM residue due to the improvement of the curing ability of the RM and improve the image sticking issue.

To achieve the above object, the present invention provides a liquid crystal composition used to manufacture a liquid crystal panel, which contains at least one type of polymerizable monomer, at least one type of liquid crystal molecule and at least one type of diluent;

wherein the diluent is a liquid crystal compound containing one or more alkenyl groups;

the polymerizable monomer is contained in the liquid crystal composition and is represented by the following formula (I):

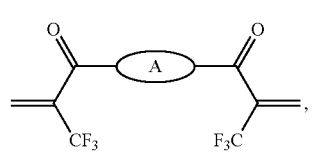

wherein
group A is a hard core and is represented by the following formula (II):

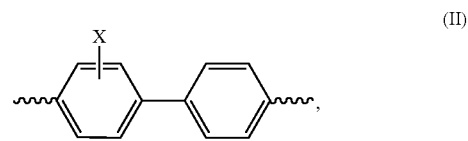

wherein X is selected from one of H, F or $CH_3$.

In one embodiment of the present invention, the liquid crystal molecule is a vertical alignment liquid crystal molecule (VA-LC).

In a preferred embodiment of the present invention, the diluent is represented by the following formula (III) or (IV):

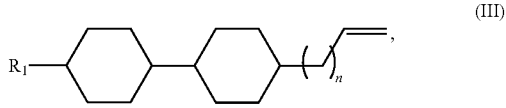

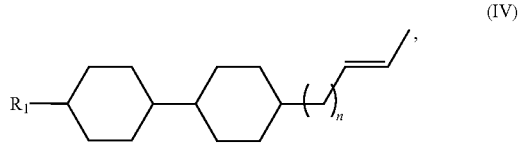

wherein $R_1$ is a alkyl group comprising 1~10 carbon atoms, and n is 1~10.

In one embodiment of the present invention, the liquid crystal composition is a liquid crystal composition of one-drop filling technology.

In a preferred embodiment of the present invention, the present invention provides a liquid crystal composition used to manufacture a liquid crystal panel, which contains at least one type of polymerizable monomer, at least one type of liquid crystal molecule and at least one type of diluent; wherein the polymerizable monomer is contained in the liquid crystal composition and is represented by the following formula (I):

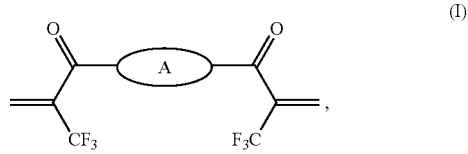

group A is a hard core and is represented by the following formula (II):

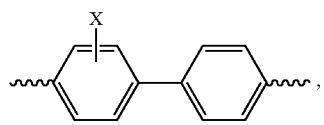

(II)

X is selected from one of H, F or $CH_3$;

the liquid crystal molecule is a conventional vertical alignment liquid crystal molecule; and the diluent is represented by the following formula (III) or (IV):

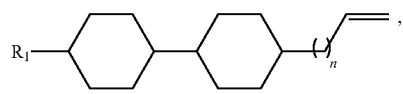

(III)

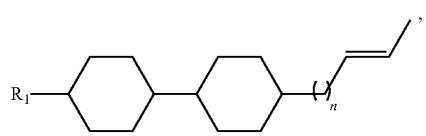

(IV)

wherein $R_1$ is a alkyl group comprising 1~10 carbon atoms, and n is 1~10.

The present invention is also to provide a liquid crystal panel containing a first transparent substrate and a second transparent substrate which are equipped with an alignment film, respectively, and the liquid crystal composition mentioned above is dispersed and distributed on surfaces of the alignment films of the first transparent substrate and the second transparent substrate.

In one embodiment of the present invention, the alignment film is a vertical alignment type alignment film.

In one embodiment of the present invention, the first transparent substrate is a color filter substrate, and the second transparent substrate is a thin film transistor array substrate.

In one embodiment of the present invention, the liquid crystal composition is a liquid crystal composition of one-drop filling technology.

In a preferred embodiment of the present invention, the present invention provides a liquid crystal panel containing a first transparent substrate and a second transparent substrate which are equipped with an alignment film, respectively, and a liquid crystal composition is distributed on the surface of the alignment film of the first transparent substrate and the second transparent substrate. The liquid crystal composition contains at least one type of polymerizable monomer, at least one type of liquid crystal molecule and at least one type of diluent; wherein the liquid crystal molecule is a conventional vertical alignment liquid crystal molecule;

the polymerizable monomer is represented by the following formula (I):

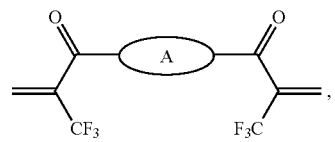

(I)

group A is a hard core and is represented by the following formula (II):

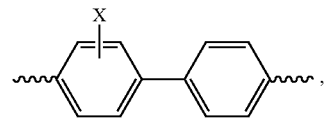

(II)

X is selected from one of H, F or $CH_3$;

the diluent is represented by the following formula (III) or (IV):

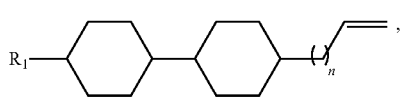

(III)

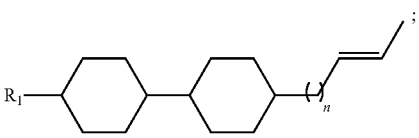

(IV)

wherein group A is a hard core containing at least one benzene ring; $R_1$ is a alkyl group comprising 1~10 carbon atoms, and n is 1~10; and the alignment film is a vertical alignment type alignment film.

It should be noted that the liquid crystal molecule in the present invention is a vertical alignment liquid crystal molecule that is already known in the art; and the alignment film is a vertical alignment type alignment film that is already known in the art. The alkyl group comprising 1~10 carbon atoms means a straight-chain or a branched alkyl group which comprises 1~10 carbon atoms, such as: methyl, ethyl, n-propyl, isopropyl, n-butyl, isobutyl, tert-butyl, sec-butyl, n-amyl, and neopentyl, etc.

The positive effect of the present invention is that: the polymerizable monomer the present invention provides is a reactive monomer (RM), which generates free radicals more easily under the UV exposure, so as to solve the RM residue due to the improvement of the curing ability of the RM and improve the image sticking issue.

wherein

Figure 1:
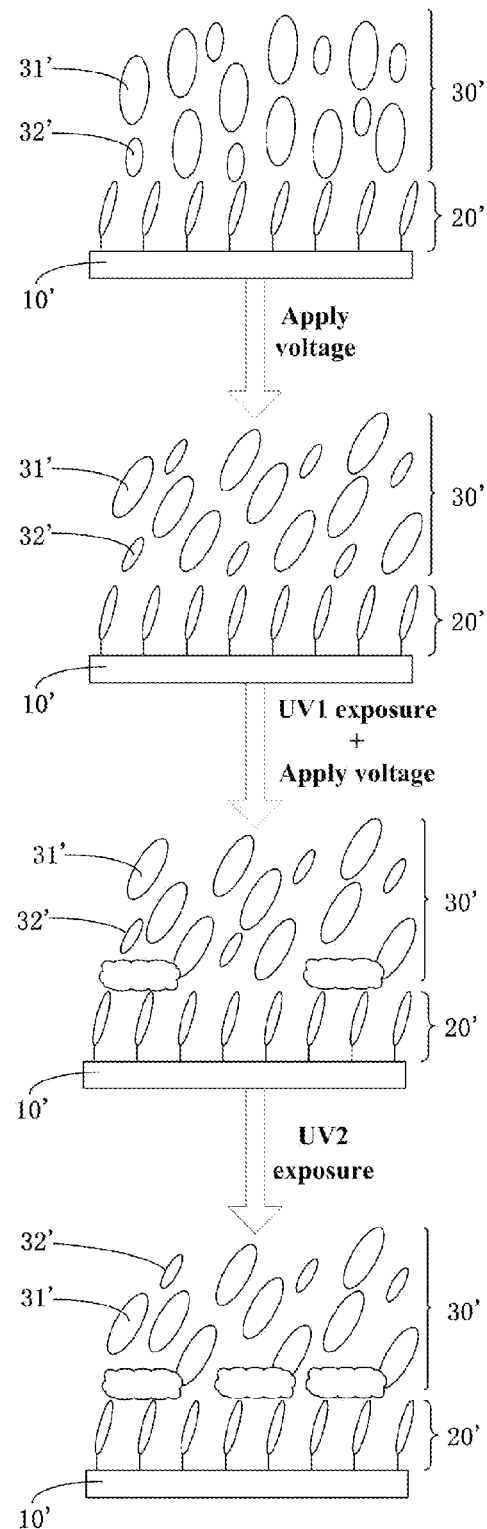
FIG. 1 is a schematic view of an alignment process of a traditional liquid crystal panel which is made of fast response liquid crystal compositions.

10'—substrate of liquid crystal panel;
20'—alignment film;
30'—fast response liquid crystal compositions in the conventional technologies;
31'—liquid crystal molecule in the conventional technologies;
32'—reactive monomer (RM) in the conventional technologies;
10—first transparent substrate of liquid crystal panel in one embodiment of the present invention;
11—second transparent substrate of liquid crystal panel in one embodiment of the present invention;
20—first alignment film of liquid crystal panel in one embodiment of the present invention;
21—second alignment film of liquid crystal panel in one embodiment of the present invention;
30—liquid crystal composition of liquid crystal panel in one embodiment of the present invention;
31—liquid crystal molecules of liquid crystal composition of the present invention;
32—diluent of liquid crystal composition of the present invention; and
33—polymerizable monomer of liquid crystal composition of the present invention.

DESCRIPTION OF THE INVENTION

Embodiments, for purposes of explanation, are set forth in order to provide a thorough understanding of the present invention and not to limit the technical solution of the present invention.

Example 1

A polymerizable monomer contained in a liquid crystal composition is provided in this embodiment, and is represented by the following formula (I):

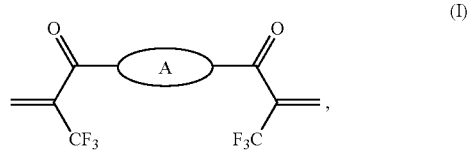
(I)

wherein group A is a hard core and is represented by the following formula (II):

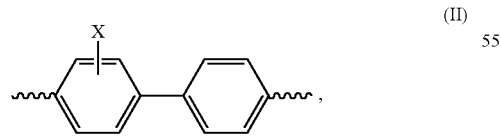
(II)

X is selected from one of H, F or CH$_3$.

Example 2

A polymerizable monomer contained in a liquid crystal composition is provided in this embodiment, and is represented by the following formula (V):

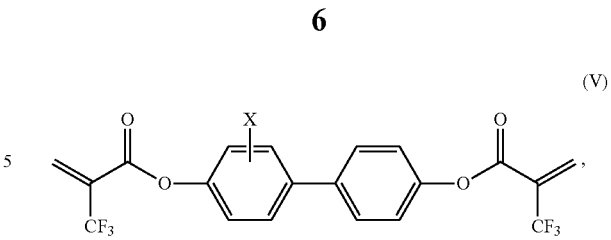
(V)

wherein X is selected from one of H, F or CH$_3$.

The scheme of the polymerizable monomer of formula (V) is as follows.

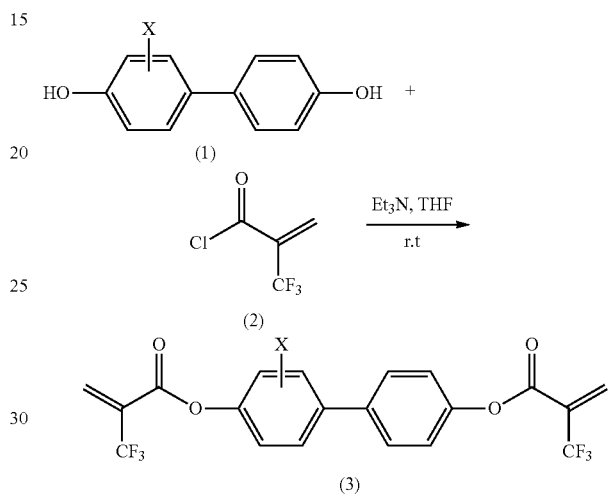

The preparation method thereof is described, as follows:

1 mmol compound (1) are loaded into a 250 ml two-neck bottle which is then deaerated and nitrogenated with a vacuum deaerating and dehydrating device for three times, and nitrogen is connected to the drip tube to keep the reaction system anaerobic and anhydrous. At the room temperature, 2 mmol Et$_3$N and 50 ml dehydrated THF are added and stirred until dissolved. In ice bath, 2.2 mmol compound (1) are loaded into the reaction system which reacts until the next day at the room temperature. The reaction system is suction filtrated with THF, and the filtrate is collected, decompressed and evaporated, extracted with ethyl acrylate (EA) and water. The filtrate is dehydrated with MgSO$_4$, suction filtrated and evaporated and vacuumed to obtain a yellow solid. Lastly, the yellow solid is purified with EA/Hexane=⅙ through silica gel column chromatography to gain a yellowish solid, that is, the target product (3). Certainly, the target product (3) may be recrystallized with THF/methanol.

Example 3

A liquid crystal composition used to manufacture a liquid crystal panel is provided in this embodiment, which contains at least one type of polymerizable monomer represented by the formula (V), at least one type of liquid crystal molecule and at least one type of diluent.

The liquid crystal molecule is a vertical alignment liquid crystal molecule that is already known in the art.

The diluent is a liquid crystal compound containing one or more alkenyl groups and is represented by the following formula (III) or (IV):

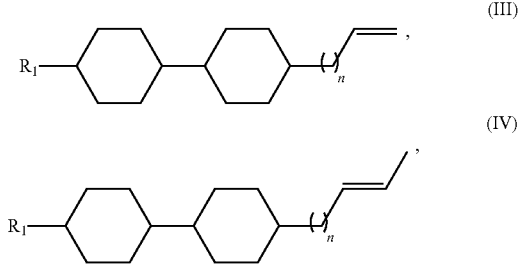

wherein $R_1$ is a alkyl group comprising 1~10 carbon atoms, and n is 1~10.

Example 4

A liquid crystal panel containing the liquid crystal composition of the present invention is provided in this embodiment.

Figure 2:
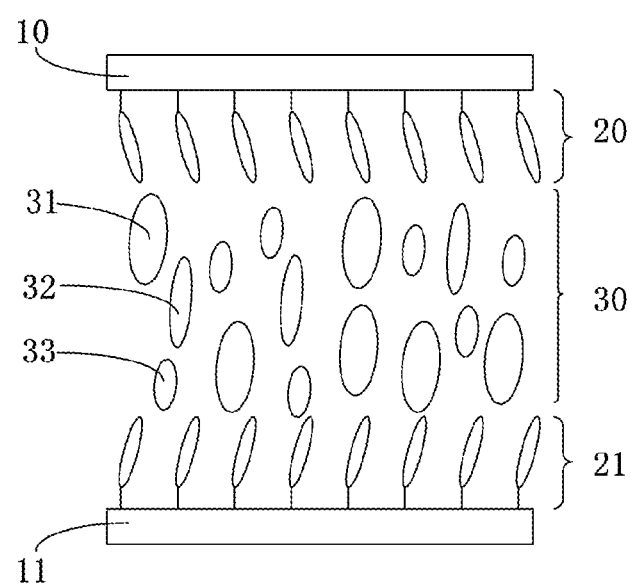
FIG. 2 illustrates a liquid crystal panel containing a liquid crystal composition of the present invention.

Referring now to FIG. 2, the liquid crystal panel of this embodiment comprises: a first transparent substrate 10 equipped with a first alignment film 20, a second transparent substrate 11 equipped with a second alignment film 21, and a liquid crystal composition 30 filled between the first transparent substrate 10 and the second transparent substrate 11. The liquid crystal composition 30 is distributed on the surface of the first alignment film 20 and the second alignment film 21.

The first transparent substrate 10 is a color filter (CF) substrate and the second transparent substrate 11 is a thin film transistor (TFT) array substrate.

Both of the first alignment film 20 and the second alignment film 21 are vertical alignment type alignment films.

The liquid crystal composition 30 is a liquid crystal composition of one-drop filling technology, which contains at least one type of liquid crystal molecule 31, at least one type of diluents 32 and at least one type of polymerizable monomer 33 mentioned above; wherein the liquid crystal molecule 31 is a conventional vertical alignment liquid crystal molecule (VA-LC).

Figure 3:
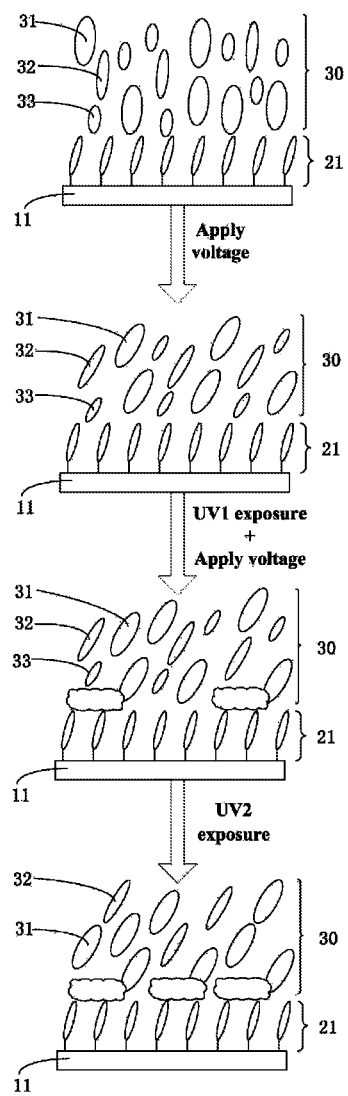
FIG. 3 is a schematic view of an alignment process of the liquid crystal panel which is made of the liquid crystal composition of the present invention.

Referring now to FIG. 3, a schematic view of the alignment process of the liquid crystal panel which is made of the liquid crystal composition of the present invention is illustrated. The liquid crystal composition 30 is dispersed and distributed on the surface of the first alignment film 20 of the first transparent substrate 10 and/or the surface of the second alignment film 21 of the second transparent substrate 11 with the one-drop filling technology, and the alignment process is completed after applying voltage, the first UV exposure, and the second UV exposure process, etc. It can be seen from FIG. 3 that the polymerizable monomer 33 in the liquid crystal composition 30 reacts completely and there is no residue remained in the liquid crystal composition 30 which improve the image sticking issue of the liquid crystal panel.

The polymerizable monomer the present invention provides is a reactive monomer (RM), which generates free radicals more easily under the UV exposure, so as to solve the RM residue due to the improvement of the curing ability of the RM and improve the image sticking issue.

The present invention has been described with relative embodiments which are examples of the present invention only. It should be noted that the embodiments disclosed are not the limit of the scope of the present invention. Conversely, modifications to the scope and the spirit of the claims, as well as the equal of the claims, are within the scope of the present invention.

What is claimed is:

1. A liquid crystal composition for manufacturing a liquid crystal panel, wherein the liquid crystal composition contains at least one polymerizable monomer, at least one liquid crystal molecule and at least one diluent different from the liquid crystal molecule;

the polymerizable monomer is represented by the following formula (I):

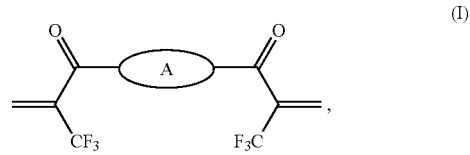

wherein group A is a hard core and is represented by the following formula (II):

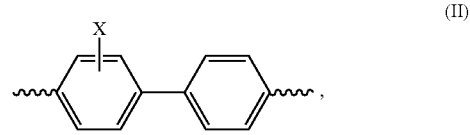

wherein X is selected from one of H, F or $CH_3$; and the diluent is a liquid crystal compound different from the liquid crystal molecule, which contains one or more alkenyl groups and is represented by the following formula (III) or (IV):

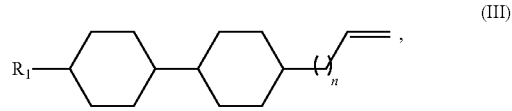

wherein $R_1$ is a alkyl group which comprises 1~10 carbon atoms and n is 1~10.

2. The liquid crystal composition according to claim 1, wherein the liquid crystal molecule is a vertical alignment liquid crystal molecule.

3. The liquid crystal composition according to claim 1, wherein the liquid crystal composition is a liquid crystal composition of one-drop filling technology.

4. A liquid crystal composition for manufacturing a liquid crystal panel, wherein the liquid crystal composition contains at least one polymerizable monomer, at least one liquid crystal molecule and at least one diluent different from the liquid crystal molecule;

the polymerizable monomer is represented by the following formula (I):

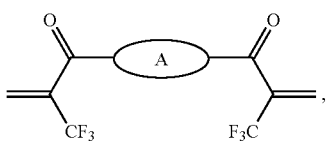

wherein group A is hard core and is represented by the following formula (II):

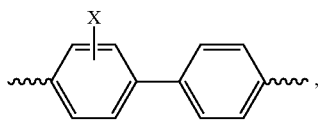

wherein X is selected from one of H, F or $CH_3$.

5. The liquid crystal composition according to claim 4, wherein the liquid crystal molecule is a vertical alignment liquid crystal molecule.

6. The liquid crystal composition according to claim 4, wherein the liquid crystal composition is a liquid crystal composition of one-drop filling technology.

7. A liquid crystal panel comprising a first transparent substrate and a second transparent substrate which are equipped with an alignment film, respectively, wherein a liquid crystal composition according to claim 1 is dispersed and distributed on surfaces of the alignment films of the first transparent substrate and the second transparent substrate.

8. The liquid crystal panel according to claim 7, wherein the alignment film is a vertical alignment type alignment film.

9. The liquid crystal panel according to claim 7, wherein the first transparent substrate is a color filter substrate, and the second transparent substrate is a thin film transistor array substrate.

10. The liquid crystal panel according to claim 7, wherein the liquid crystal composition is a liquid crystal composition of one-drop filling technology.

* * * * *